US005121827A

United States Patent [19]

Ribordy

[11] Patent Number: 5,121,827

[45] Date of Patent: Jun. 16, 1992

[54] CAM-ACTUATED CONTAINER ROTATING APPARATUS

[75] Inventor: James E. Ribordy, South Beloit, Ill.

[73] Assignee: Weiler Engineering, Inc., Arlington Heights, Ill.

[21] Appl. No.: 649,751

[22] Filed: Jan. 31, 1991

[51] Int. Cl.[5] .............................................. B65G 47/24

[52] U.S. Cl. ...................................... 198/377; 101/40; 118/232; 118/320; 156/567; 156/DIG. 26

[58] Field of Search ................................ 198/377-379; 101/38.1, 39, 40, 40.1; 156/567, DIG. 26; 118/230, 232, 319, 320, 503

[56] References Cited

U.S. PATENT DOCUMENTS 4,201,621 5/1980 Crankshaw et al. .
4,203,789 5/1980 Yamashita .
4,406,721 9/1983 Hoffmann .
4,416,714 11/1983 Hoffmann .
4,515,651 5/1985 MacLaughlin et al. ............ 156/567
4,605,459 8/1986 Voltmer et al. .
4,721,544 1/1988 Zodrow et al. .
4,786,354 11/1988 Makino .
4,787,953 11/1988 Trouteaud et al. .
4,798,648 1/1989 Freeman .
4,806,197 2/1989 Harvey ........................ 156/DIG. 26
4,895,614 1/1990 Trouteaud et al. .

*Primary Examiner*—Joseph E. Valenza
*Attorney, Agent, or Firm*—Dressler, Goldsmith, Shore, Sutker & Milnamow, Ltd.

[57] ABSTRACT

An apparatus is disclosed suitable for presenting a container at a labeling station where the container is oriented before, during or after the time a label is affixed to the container. The apparatus includes a turntable that is rotatable about a fixed axis. A turret is provided on the turntable for rotation about a turret axis substantially parallel to the fixed axis. The turret is adapted to receive a container. A cam follower carriage is mounted to the turntable for reciprocal movement along the turret axis and is operatively engaged with the turret for rotating the turret when reciprocated. Reciprocal movement is imparted to the carriage by a lower cam.

10 Claims, 4 Drawing Sheets

CAM-ACTUATED CONTAINER ROTATING APPARATUS

TECHNICAL FIELD

This invention relates to apparatus suitable for presenting a container at a labeling station and orienting the container while at that station. The invention more particularly relates to an improved system for rotating a container about its axis as the container is carried on a turntable along a generally circular path past a labeling station.

BACKGROUND OF THE INVENTION AND TECHNICAL PROBLEMS POSED BY THE PRIOR ART

Devices have been proposed for automatically feeding a supply of bottles or other containers seriatim in a circular path past a labeling station and for rotating each bottle about its axis as it moves past the labeling station where a label is applied to the bottle. See for example U.S. Pat. Nos. 4,721,544 and 4,416,714.

While such designs provide a generally satisfactory operation in specific applications, it would be desirable to provide an improved system which could be adapted for use with a variety of containers.

Further, it would be beneficial if such an improved system could accommodate relatively rapid rotation of each container in a relatively short circular arc travel path past the labeling station.

It would also be advantageous if the design for such an improved system could be assembled from mechanisms that can be easily manufactured and that would have improved reliability during operation.

SUMMARY OF THE INVENTION

The present invention provides a novel apparatus for presenting a container at a labeling station and orienting the container while at the station. The orientation can be effected before, while, or after a label is affixed to the container.

The apparatus is relatively compact, reliable at high speed operation, easily fabricated, and easily adapted to handle a variety of containers.

The apparatus also effects rotation of each container moving past the labeling station in a relatively short circular arc. The apparatus is particularly well-suited for high production rate systems in which a plurality of containers can be accommodated seriatim in a rapid and efficient manner.

The apparatus includes a turntable and a drive means for rotating the turntable about a fixed axis. A turret is provided for receiving the container, and the turret is mounted to the turntable for rotation about a turret axis that is substantially parallel to, but radially spaced from, the turntable fixed axis.

A cam follower carriage is mounted to the turntable for reciprocal movement along the turret axis and is operatively engaged with the turret for rotating the turret when the turret is reciprocated. Means are provided for imparting reciprocal movement to the carriage when the turntable is rotated.

In a preferred embodiment, the means for imparting reciprocal movement includes (1) a cam surface defined by the top surface of a cylindrical wall that has a height which varies around the circumference of the wall and (2) a first cam follower roller mounted to the bottom of the carriage for engaging the wall top surface. The turret includes a shaft portion which defines at least one cam groove extending along the shaft portion, and a cam follower means is mounted to the carriage and is engaged with the cam groove.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

DESCRIPTION OF THE PREFERRED EMBODIMENTS

This invention provides a novel system for presenting containers at a labeling station. The invention can be incorporated in apparatus that is highly reliable and yet capable of operating at relatively great speed with high efficiency. The apparatus can accommodate a variety of containers.

While this invention is susceptible of embodiment in many different forms, this specification and the accompanying drawings disclose only some specific forms as examples of the invention. The invention is not intended to be limited to the embodiments so described, and the scope of the invention will be pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, used, and sold in an orientation other than the position described.

Some of the figures illustrating embodiments of the apparatus show structural details and mechanical elements that will be recognized by one skilled in the art. However, the detailed descriptions of such elements are not necessary to an understanding of the invention, and accordingly, are not herein presented.

The apparatus of this invention is used with certain conventional components the details of which, although not fully illustrated or described, will be apparent to those having skill in the art and an understanding of the necessary functions of such components.

Figure 1:
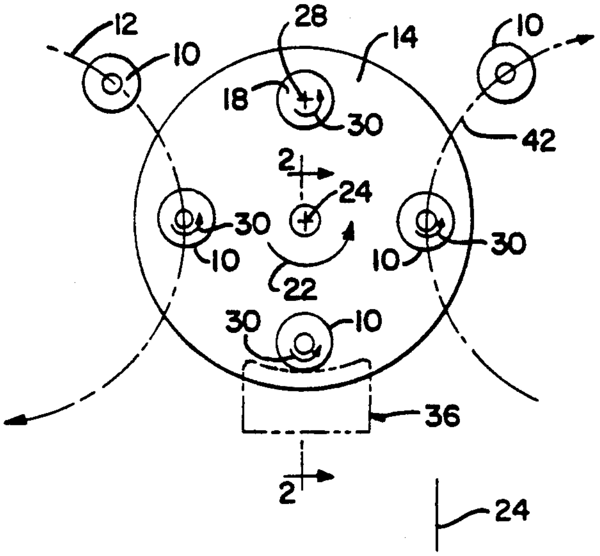
FIG. 1 is a simplified, diagrammatic, plan view of the apparatus of the present invention.

Referring now to the drawings, the general arrangement and sequence of operation of the novel apparatus can be best understood with reference to FIG. 1. Containers 10 are fed along a path 12 to a turntable 14. The containers 10 may be fed along the path 12 by any suitable special or conventional mechanism (not illustrated), such as an inlet drum or star wheel feeder. Such mechanisms are well-known, and the details of the design and operation of such mechanisms form no part of the present invention.

The turntable 14 includes a plurality of circumferentially space-apart container-receiving platforms or turrets 18 (one empty turret 18 being visible at the "12 o'clock" position in FIG. 1). Each platform or turret 18 receives a container 10 as the turntable 14 rotates to carry the turrets 18 about a first or fixed axis 24 through a point of tangency with the feed path 12.

Each turret 18 is rotated about a second axis 28 in the direction of arrow 30 as the turret is moved along in a generally circular path by the turntable 14. Adjacent the turntable there is a labeling station 36 which applies labels to each rotating container 10 as each container is carried past the labeling station 36.

The labeling station 36 may be of any suitable special or conventional design. One conventional design, which includes a magazine from which individual labels may be applied by a label box, is described in U.S. Pat. No. 4,721,544. With some label-applying mechanisms, gluing devices (not illustrated) are provided for applying glue to the containers and/or the labels. The detailed design and operation of such labeling stations and gluing devices form no part of the present invention.

After the label has been applied to the container 10 at the labeling station 36, the labeled container is carried by the turntable 14 for transfer to a discharge path 42. Such a transfer may be effected by special or conventional mechanisms (not illustrated), such as an outlet drum or star wheel, and the details of the design and operation of such mechanisms form no part of the present invention.

Figure 2:
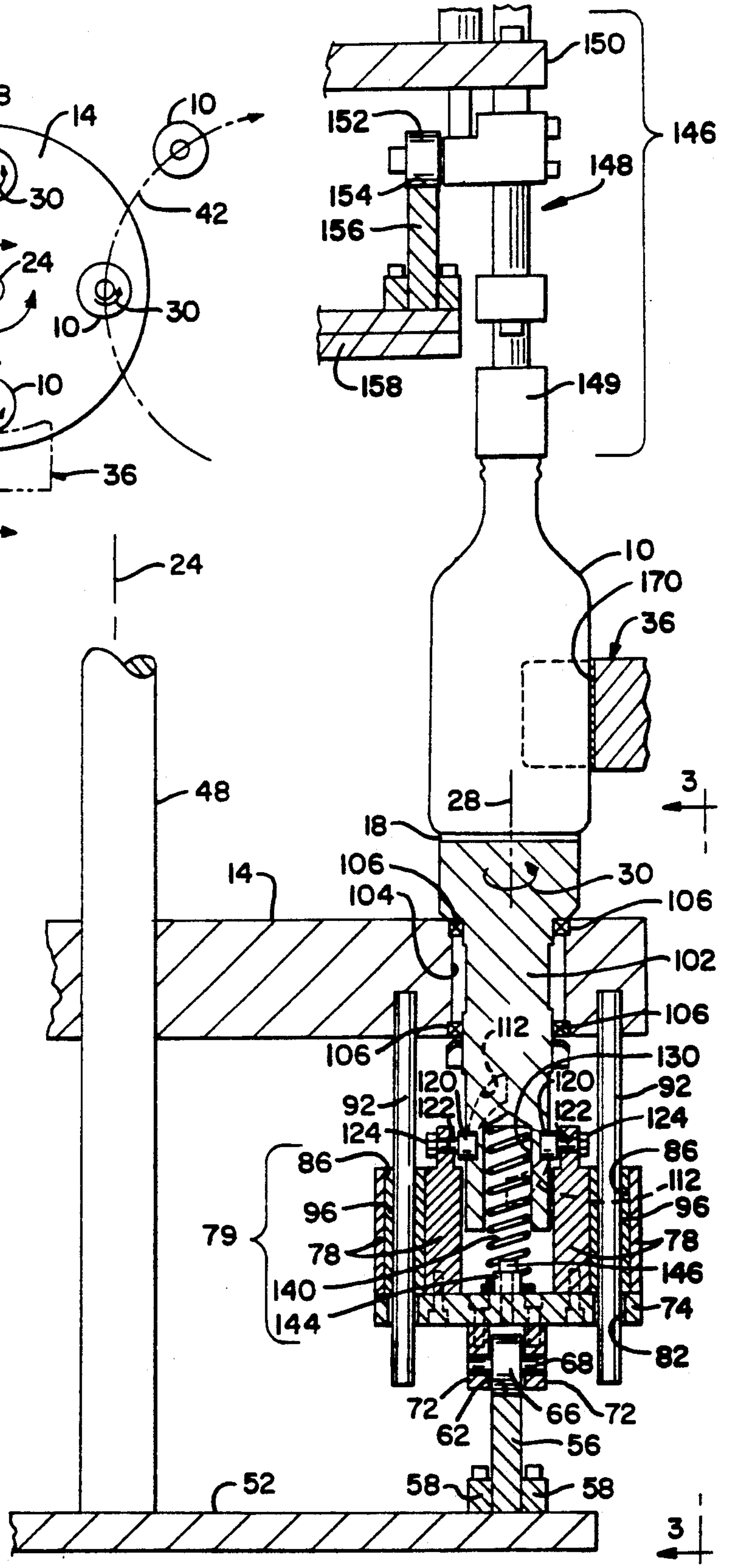
FIG. 2 is a greatly enlarged, fragmentary, partial cross-sectional view taken generally along the plane 2—2 in FIG. 1.
Figure 3:
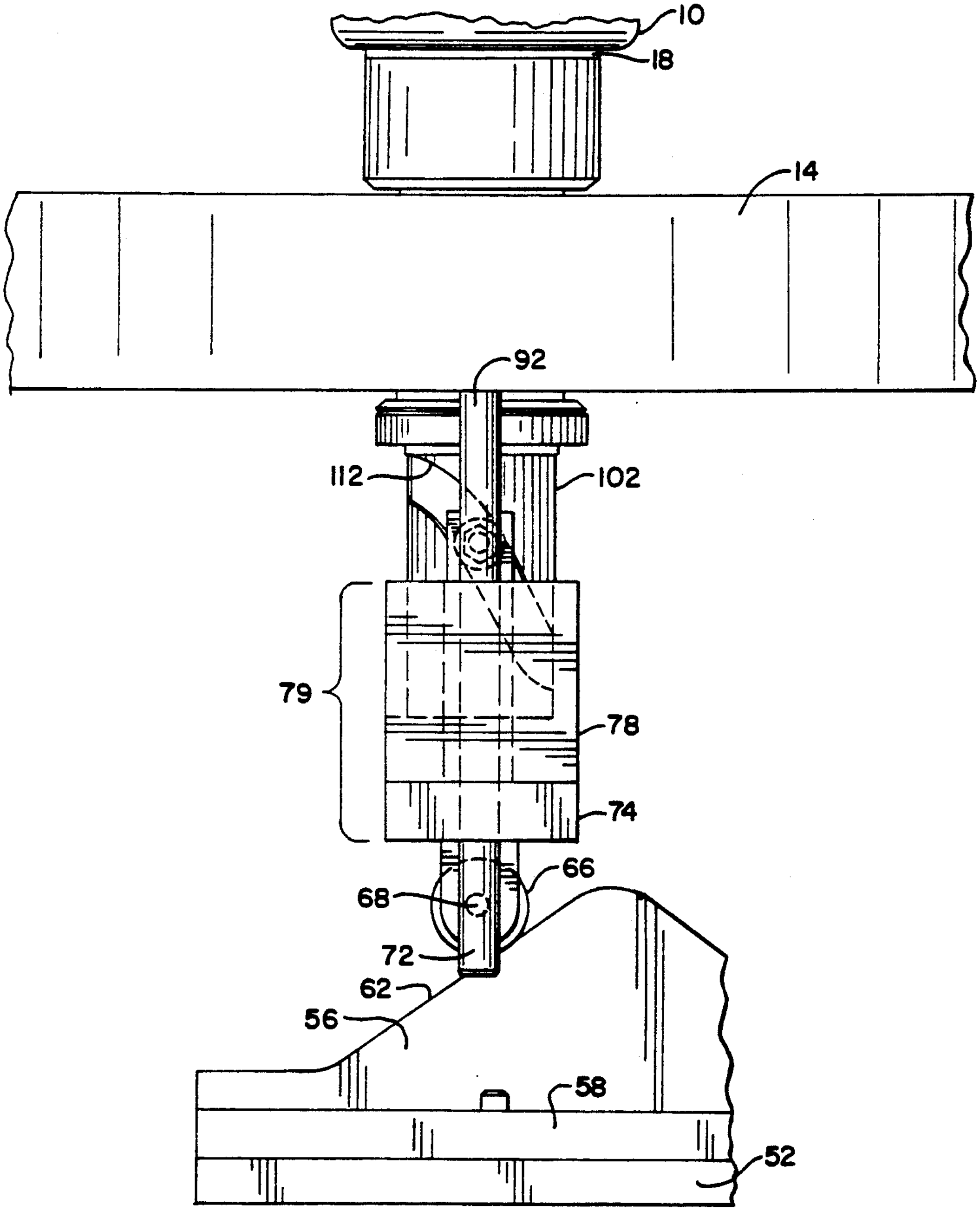
FIG. 3 is a fragmentary, side elevational view taken generally along the plane 3—3 in FIG. 2.

A preferred embodiment of the apparatus for presenting the containers at the labeling station 36 is illustrated in FIGS. 2 and 3. The turntable 14 is mounted to a shaft 48 which rotates about the fixed axis 24. The shaft 48 functions as a drive means for rotating the turntable 14 about the fixed axis. To this end, the shaft is operatively coupled to a suitable motor (not illustrated) or other system for effecting rotation of the shaft.

The top of each container 10 can be engaged by a downwardly acting clamp assembly 146 so as to hold the container 10 on the platform or turret 18. To this end, a conventional, spring-loaded plunger clamp mechanism 148 is carried on an upper turntable 150 which is rotated by the shaft 48 with the turntable 14. The clamp mechanism 148 includes a freely rotatable clamp member 149 for engaging the top of the container 10 and being rotated with the container 10 relative to the remaining components of the clamp mechanism 148.

The clamp mechanism 148 is adapted to be vertically reciprocated relative to the turntable 150, and hence, relative to the top of the container 10, by means of a cam-actuated system. In particular, a cam follower roller 152 is connected to the plunger mechanism 148 and is biased downwardly to engage an upwardly facing cam surface 154 on a cam track 156 which is circumferentially mounted around the shaft 48 on a fixed frame 158. The cam track 156 has an increased vertical elevation at the region in the rotational path of the turntable 14 wherein it is desired to release the top of the container, namely the point of transfer of the container 10 to the discharge path 42 (FIG. 1). The cam 156 maintains the clamp mechanism 148 in the elevated position until the system has rotated the empty turret 18 to the feed path 12 where the cam track 156 lowers so as to effect engagement of the clamp mechanism 148 with the top of a new container.

Alternatively, a pneumatic clamping device can be used, e.g., the clamp assembly 146 can be actuated pneumatically. The clamp assembly 146 may be of any suitable special or conventional design well-known to those of ordinary skill in the art. The detailed design and operation of the components of the clamp assembly 146 form no part of the present invention.

The lower end of the shaft 48 is mounted for rotation on a fixed base plate 52 which is spaced below, and which is generally parallel to, the turntable 14. A cam 56 is mounted to the base plate 52 between a pair of guide rings 58 which are bolted to the plate 52. The cam 56 is a cylindrical wall which varies in height circumferentially and which has a top surface defining a cam surface 62. Adjacent the labeling station 36, the cam surface 62 can be characterized as having increasing longitudinal displacement (height) relative the axis 24 with increasing angular displacement around the axis. Beyond the label station 36, the cam 56 returns to a lower height which may be uniform around the remaining portion of the circumferential wall.

The cam surface 62 is engaged by a cam follower means or roller 66 carried on a shaft 68 which is mounted in brackets 72 depending from a support plate 74. The support plate 74 is mounted to the bottom of a block 78.

The support plate 74 defines a pair of bores 82, and the block 78 defines a pair of bores 86 aligned with the bores 82. The bores are adapted to receive a pair of guide members or rods 92 which are attached to, and project downwardly from, the turntable 14. Bearings 96 are provided within the block bores 86 to slidably receive the guide rods 92. The block 78, bearings 96, support plate 74, and brackets 72 may be characterized as a cam follower carriage 79 which is adapted for reciprocal movement along the axis 28 of the platform or turret 18.

The turret 18 includes a shaft portion 102 which extends through a bore 104 in the turntable 14. The shaft 102 has a longitudinal axis which is colinear with the turret axis 28, and bearings 106 are provided in the turntable bore 104 for accommodating the rotation of the shaft portion 102 therein. The shaft portion 102 is axially retained within the turntable 14 by the bearings 106 and undergoes no axial movement relative to the turntable 14.

The turret shaft portion 102 which extends below the turntable 14 defines a pair of cam tracks or grooves 112. The cam grooves 112 are on opposite sides of the shaft portion 102 and have identical configurations. Each cam track or groove 112 is disposed in a curve around the shaft portion and has an increasing longitudinal displacement along the axis with increasing angular displacement around the axis Cam follower rollers 120 are mounted to upwardly projecting extensions of the carriage block 78. Each roller 120 is mounted on a shaft 122 secured by a nut 124 to the block 78. Each roller 120 is adapted to engage a cam track 112.

As illustrated in FIG. 2, the lower end of the shaft portion 102 includes a downwardly open recess 130 in which is disposed a compression spring 140. The lower end of the compression spring is received around an upwardly projecting sleeve 144 mounted to the bottom support plate 74 by means of a bolt 146. Since the shaft portion 102 is axially fixed relative to the turntable 14, the compression spring 140 normally functions to bias the bottom plate 74 downwardly along with the other attached components of the carriage 79 so as to urge the rollers 120 to the bottoms of the cam tracks 112.

When the turntable 14 is rotated by the shaft 48, the lower cam follower roller 66 follows the cam surface 62. In the region of the labeling station 36, the roller 66 initially moves upwardly with the rising cam surface 62, and the carriage 79 is forced upwardly along the guide rods 92. As the carriage 79 moves upwardly, the cam follower rollers 120 in the shaft portion cam tracks 112 are moved upwardly. This, by virtue of the roller engagement with the cam tracks 112, effects the rotation of the shaft portion 102, and hence of the turret 18, so as to rotate the container 10 as the container 10 is carried past the labeling station 36.

The label 170 is applied to the container 10 as the container rotates past the labeling station 36. This effects a wrap-around placement of the label 170 onto the container 10.

After the label 170 has been applied to the container 10, and after the container has been carried by the turntable 14 beyond the labeling station 36, the lower cam follower roller 66 begins to move downwardly along the inclined portion of the cam surface 62 under the biasing force of the spring 140. This lowers the carriage 79 along the turret shaft portion 102 and causes the turret 18 and container 10 to be rotated back to the original orientation on the turntable 14.

Alternatively, the present apparatus can be utilized to orient the container before, as well as after, a label has been affixed thereto by appropriate timing of the involved cams.

If desired, additional stations may be provided around the periphery of the turntable 14 for accommodating other operations, such as applying glue to the containers, brushing down the labels on the containers, applying additional labels to the containers, etc. If such other stations require rotation of the containers, the cam surface 62 can be provided with suitable vertical elevation increases at the proper circumferential locations so as to again drive the carriage 79 upwardly to rotate the container as necessary.

It will be appreciated that the change in elevation of the cam surface 62 can be relatively steep or can be relatively gradual, depending upon the rotational requirements at the station. In addition, the amount and rate of rotation can be controlled by the length and steepness of the cam tracks 112 on the shaft portion 102. Thus, this design accommodates a wide variety of applications with relatively simple changes to the designs of selected components. Further, the apparatus can be fabricated in modular units to accommodate readily interchangeable cams 56 and shaft portions 102 having different cam surfaces as may be desired for a particular application.

Figure 4:
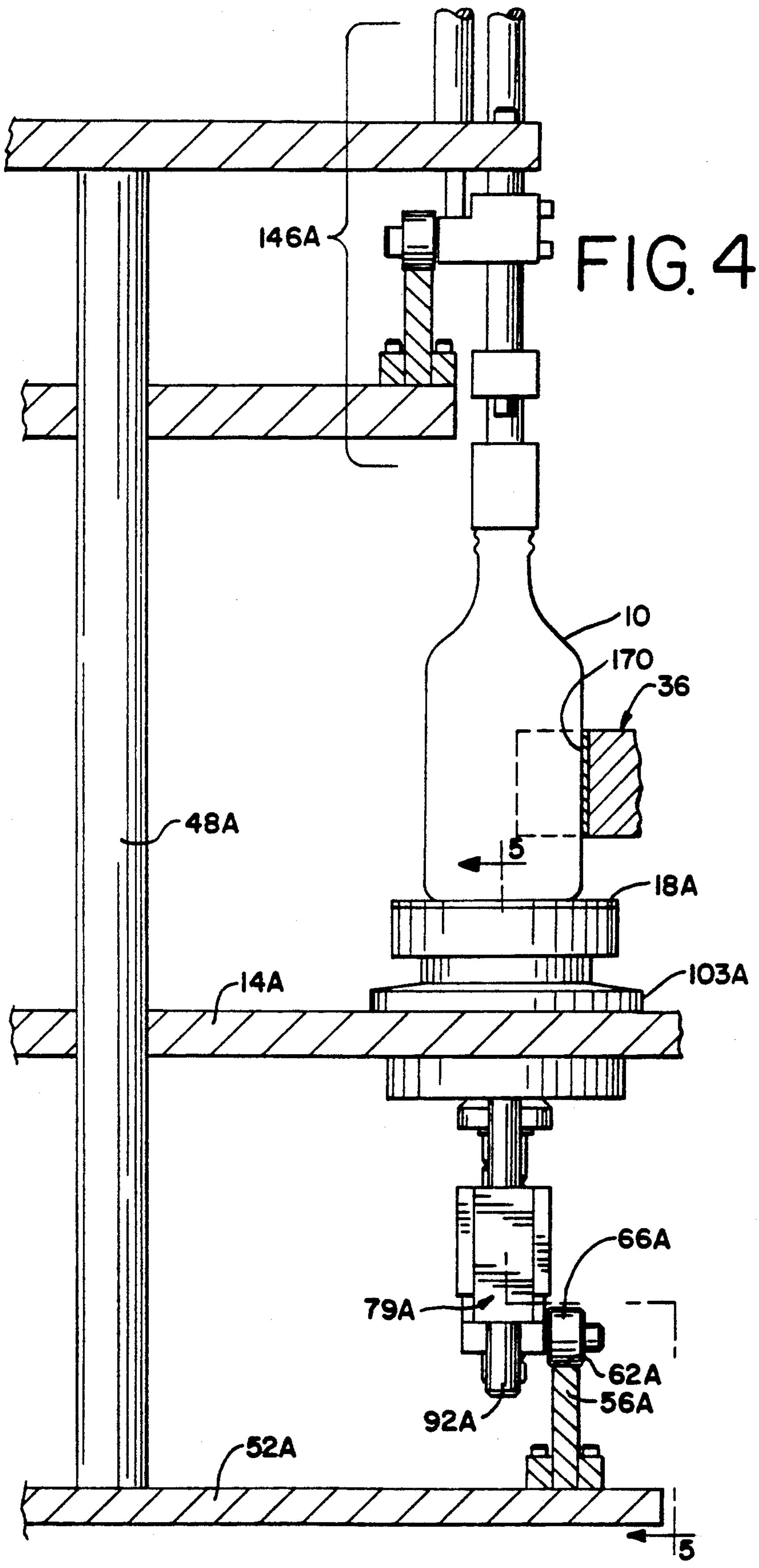
FIG. 4 is a view similar to FIG. 2, but showing an alternate embodiment.
Figure 6:
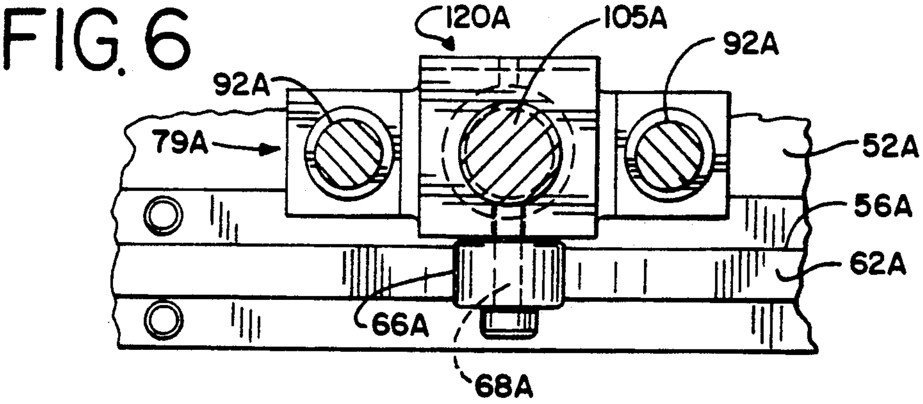
FIG. 6 is a fragmentary, cross-sectional view taken generally along the plane 6—6 in FIG. 5.
Figure 5:
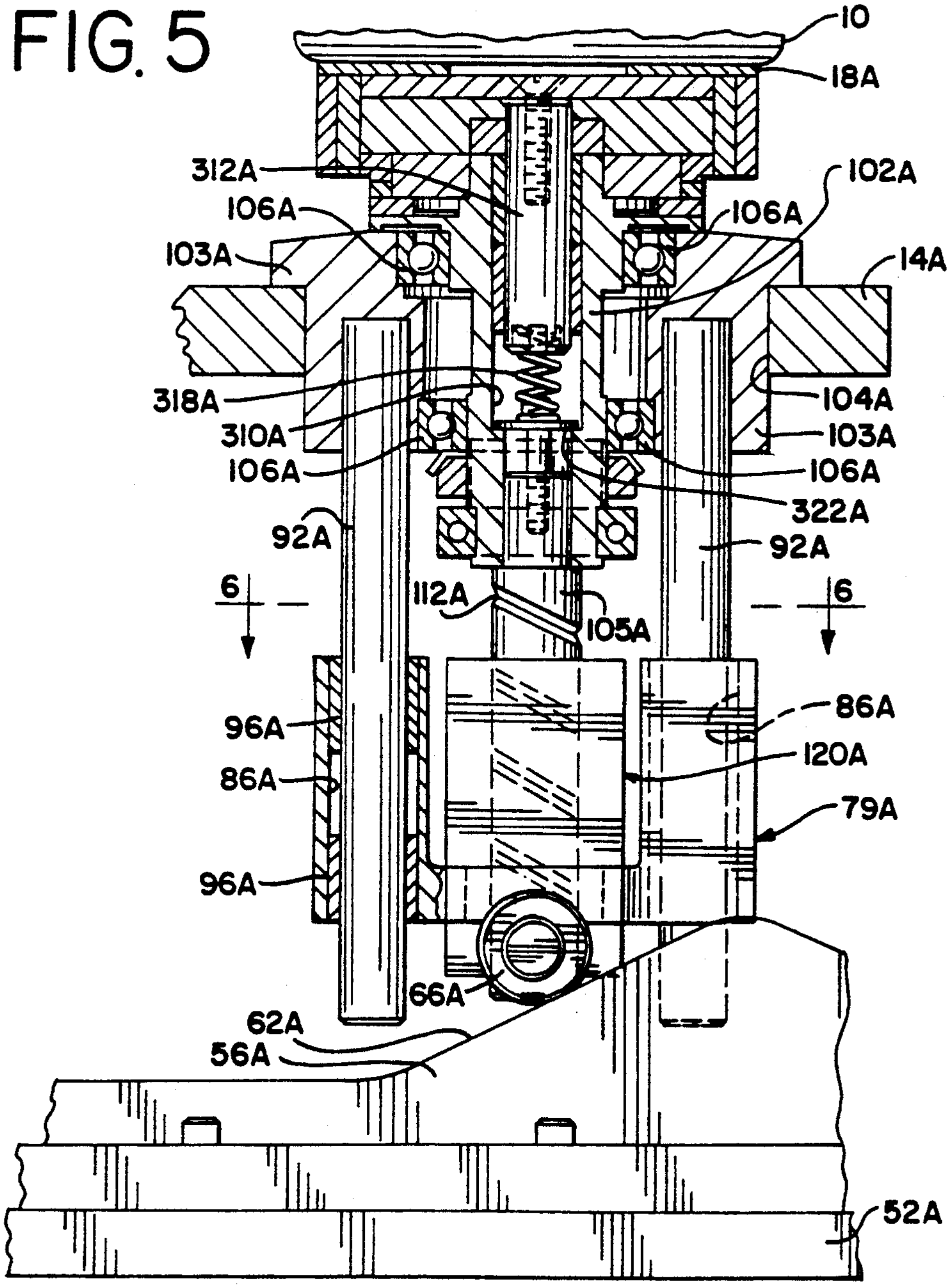
FIG. 5 is a greatly enlarged, fragmentary, partial cross-sectional view taken generally along the planes 5—5 in FIG. 4.

An alternate embodiment of the present invention is illustrated in FIGS. 4–6. The alternate embodiment is similar, and functions in a similar manner, to the preferred embodiment described above with reference to FIGS. 1–3. The elements of the alternate embodiment that are identical or functionally analogous to those of the preferred embodiment are designated by reference numerals identical to those used for the preferred embodiment with the exception that the alternate embodiment reference numerals are followed by the upper case letter A.

The alternate embodiment includes a turntable 14A mounted above a fixed base plate 52A to a shaft 48A connected to suitable means (not illustrated) for effecting rotation of the turntable 14A. The turntable 14A carries a turret or platform 18A on which a container 10 is supported below a releasable, upper, hold-down clamp assembly 146A that is identical to that employed with the above-described preferred embodiment of the apparatus illustrated in FIGS. 1–3. The clamp assembly 146A may employ any suitable special design or conventional design well-known to those of ordinary skill in the art. The detailed design and operation of the components of the clamp assembly 146A form no part of the present invention.

The turret 18A is mounted on a shaft assembly that includes a shaft portion 102A extending through, and projecting below, the turntable 14A. The shaft portion 102A is rotatably carried by a base 103A which is mounted in a bore 104A in the turntable 14A. Conventional ball bearing assemblies 106A are interposed between the lower shaft portion 102A and the base 103A to accommodate rotation of the shaft portion 102A, and hence of the turret 18A, relative to the base 103A and turntable 14A. This arrangement, while accommodating rotation of the shaft portion 102A, prevents axial movement of the shaft portion 102A.

A ball screw shaft 105A is mounted to the bottom of the shaft portion 102A and defines a thread form or cam groove 112A. A conventional ball screw nut 120A is received on the ball screw shaft 105A and is engaged with the groove 112A. The ball screw nut 120A is mounted to a carriage 79A which defines a pair of bores 86A each receiving a guide member or rod 92A which is mounted to the base 103A and projects downwardly below the turntable 14A parallel to the colinear axes of the turret 18A and ball screw shaft 105A. Bushings 96A are carried by the carriage 79A within the bores 86A to accommodate reciprocal movement of the carriage 79A along the guide rods 92A.

A shaft 68A (FIG. 6) projects outwardly from the carriage 79A below the ball screw nut 120A. A lower cam follower roller 66A is mounted to the shaft 68A for engagement with a cam surface 62A of a cam 56A. Rotation of the turntable 14A causes the lower cam follower roller 66A to follow the incline of the cam surface 62A and move the carriage 79A upwardly along the ball screw shaft 105A. This effects rotation of the turret or platform 18A so as to rotate the container 10. As with the first embodiment described above with reference to FIGS. 1–3, the cam 56A in the second embodiment is configured to raise the carriage 79A so as to effect rotation of the turret (and container thereon) as it moves along a circumferential arc path adjacent the labeling station 36.

If desired, means may be provided for assisting in lowering the ball screw nut carriage 79A downwardly along a declining portion of the cam surface 62A. Such means, although not illustrated, may include spring mechanisms (e.g., analogous to spring 140 employed in the first embodiment illustrated in FIG. 2) or may include other mechanisms, such as a pneumatic piston-cylinder actuator (not illustrated) operative between the turntable 14A and the carriage 79A.

If desired, means may be provided for spring loading the turret or platform 18A upwardly. To this end, the turret shaft assembly can be provided with a cavity or bore 310A in which is received a rod 312A that is connected at its upper end to the turret shaft assembly and which has a lower end for receiving the upper end of a compression spring 318A. The lower end of the compression spring 318A bears against an annular disk 322A seated on an annular shoulder within the shaft assembly cavity 310A. This structure functions to bias the turret 18A upwardly a predetermined amount when a container 10 is not seated thereon. However, when a container 10 is disposed on the turret 18A and held down by the hold down clamp assembly 146A, the spring 318A is compressed until the turret and shaft assembly components bottom out in axial engagement at a predetermined elevation (as illustrated).

It will be readily observed from the foregoing detailed description of the invention and from the illustrations thereof that numerous variations and modifications may be effected without departing from the true spirit and scope of the novel concepts or principles of this invention.

What is claimed is:

1. Apparatus suitable for presenting a container at a labeling station and orienting said container while at said station, said apparatus comprising:

a turntable;

drive means for rotating said turntable about a fixed axis;

a turret for receiving said container and mounted to said turntable for rotation about a turret axis substantially parallel to said fixed axis but radially spaced therefrom;

a cam follower carriage mounted to said turntable for reciprocal movement along said turret axis and operatively engaged with said turret for rotating said turret when reciprocated; and means for imparting reciprocal movement to said carriage when said turntable is rotated.

2. The apparatus in accordance with claim 1 in which said means for imparting reciprocal movement includes (1) a cam surface having increasing longitudinal displacement along said fixed axis with increasing angular displacement and (2) first cam follower means on said carriage and engaged with said first cam surface for following said first cam surface when said turntable is rotated so as to effect axial movement of said carriage.

3. The apparatus in accordance with claim 2 in which said cam surface is defined by the top surface of a cylindrical wall having a height which varies around the circumference of said wall; and said first cam follower means is a roller mounted to the bottom of said carriage for engaging said wall top surface.

4. The apparatus in accordance with claim 1 in which said turret includes a screw shaft defining a cam track having increasing longitudinal displacement along said turret axis with increasing angular displacement around said turret axis; and said apparatus includes a second cam follower means on said carriage and engaged with said cam track, said second cam follower means including a ball nut engaged with said screw shaft.

5. The apparatus in accordance with claim 1 in which said turret is mounted on a bearing in said turntable and extends through said turntable;

said turret has a container-receiving platform projecting above said turntable and has a shaft portion extending below said turntable with the axis of the shaft portion being colinear with said turret axis;

at least one guide member is mounted to said turntable and extends below said turntable to define a guide path for said reciprocal movement along said turret axis; and said carriage is slidably received on said guide member for reciprocal movement along said guide member.

6. The apparatus in accordance with claim 5 in which said turret shaft portion defines at least one cam groove extending along said shaft portion; and said apparatus includes a cam follower roller mounted to said carriage and engaged with said cam groove.

7. Apparatus suitable for presenting a container at a labeling station and orienting said container while at said station, said apparatus comprising:

a turntable and drive means for rotating said turntable about a first axis;

a turret for receiving said container and mounted on said turntable for rotation relative to said turntable about a second axis that is parallel to said first axis;

a carriage and mounting means for mounting said carriage to said turntable for movement along said second axis;

first cam means responsive to the rotational position of said turntable for effecting axial movement of said carriage; and second cam means operative between said carriage and said turret for effecting rotation of said turret during axial movement of said carriage.

8. The apparatus in accordance with claim 7 in which said first cam means includes (1) a cam surface having increasing longitudinal displacement along said first axis with increasing angular displacement around said first axis and (2) first cam follower means on said carriage and engaged with said first cam surface for following said first cam surface when said turntable is rotated so as to effect axial movement of said carriage; and said second cam means includes (1) a screw shaft defining a cam track having increasing longitudinal displacement along said second axis with increasing angular displacement around said second axis and (2) a second cam follower means on said carriage and engaged with said cam track, said second cam follower means including a ball nut engaged with said screw shaft.

9. Apparatus for presenting a container at a labeling station and rotating said container while at said station for affixing a label to said container, said apparatus comprising:

a turntable and drive means for rotating said turntable about a first axis;

a cam surface having increasing longitudinal displacement along said first axis with increasing angular displacement around said first axis;

a turret mounted on said turntable for rotation relative to said turntable about a second axis that is parallel to said first axis, said turret including a platform for receiving said container and including a cam track having increasing longitudinal displacement along said second axis with increasing angular displacement around said second axis;

a carriage and mounting means for mounting said carriage to said turntable for permitting linear movement along said second axis relative to said cam track while preventing rotational movement about said second axis;

first cam follower means on said carriage and engaged with said first cam surface for following said first cam surface when said turntable is rotated so as to effect axial movement of said carriage; and second cam follower means on said carriage and engaged with said cam track for effecting rotation of said turret during axial movement of said carriage.

10. The apparatus in accordance with claim 9 in which said cam track on said turret comprises a screw shaft; and said second cam follower includes a ball nut engaged with said screw shaft and restrained against rotation relative to said shaft.

* * * * *